United States Patent [19]

Jonckheere et al.

[11] Patent Number: 5,495,075
[45] Date of Patent: Feb. 27, 1996

[54] COAXIAL CONNECTOR

[75] Inventors: Luc Jonckheere, Leuven; Hubert Booghmans, Wolvertem, both of Belgium

[73] Assignee: Burndy Corporation, Norwalk, Conn.

[21] Appl. No.: 198,646

[22] Filed: Feb. 18, 1994

Related U.S. Application Data

[63] Continuation of Ser. No. 950,624, Sep. 24, 1992, abandoned.

[30] Foreign Application Priority Data

Oct. 9, 1991 [NL] Netherlands .......................... 9101695

[51] Int. Cl.⁶ .......................... H02G 15/02; H01R 17/18
[52] U.S. Cl. .................. 174/74 R; 174/75 C; 174/78; 439/610
[58] Field of Search ........................... 174/74 R, 75 C, 174/78, 74 A, 75 A, 75 R, 82, 88 C; 439/98, 610; 29/748, 828

[56] References Cited

U.S. PATENT DOCUMENTS

| | | | |
|---|---|---|---|
| 3,426,317 | 9/1966 | Krol | 29/828 |
| 3,736,548 | 5/1973 | Double | 124/74 R |
| 4,110,550 | 8/1978 | Di Pietro | 174/75 R |
| 4,707,566 | 11/1987 | Titcombe et al. | 174/78 X |
| 4,719,697 | 1/1988 | Schwartzman et al. | 29/867 |
| 4,897,046 | 1/1990 | Tengler et al. | 439/610 X |
| 5,145,409 | 9/1992 | Sato et al. | 439/610 X |
| 5,149,916 | 9/1992 | Baker et al. | 174/74 R |

Primary Examiner—Timothy V. Eley
Assistant Examiner—Khan V. Nguyen
Attorney, Agent, or Firm—Perman & Green

[57] ABSTRACT

A contact device for a cable comprising one or more inner conductors with inner insulating sheath and a common shield with outer insulating sheath, comprises a connection terminal for the shield and a connection element for each inner conductor. Further a guiding element and a stop element are provided for each inner conductor. The guiding element directs the corresponding inner conductor with its insulating sheath at the corresponding stop element in such a manner that during insertion of the cable into the contact device the inner insulating sheath is axially compressed by the stop element by the stop element. Seen from the corresponding guiding element each connection terminal for an inner conductor lies beyond the corresponding stop element. By application of this contact device it is no longer necessary to remove the inner insulating sheath.

7 Claims, 4 Drawing Sheets

COAXIAL CONNECTOR

This is a continuation of application Ser. No. 07/950,624 filed on Sep. 24, 1992, abandoned.

The invention relates to a contact device for a cable comprising one or more inner conductors with an inner insulating sheath and a common shield with an outer insulating sheath, said contact device comprising a connection terminal for the shield and a connection terminal for each inner conductor.

BACKGROUND OF THE INVENTION

In particular with coaxial or twinaxial cables adapted to be used in high frequency applications wherein the type of material of the inner insulating sheath(s) is such that removing these inner insulating sheath(s) to expose the inner conductor(s) by cutting or stripping the inner insulating sheath is hardly possible, connecting a known contact device of the above-mentioned type with the cable such as a coaxial or twinaxial cable, is rather complicated.

U.S. Pat. No. 4,719,697 discloses a method and device wherein the inner insulating sheath of an inner conductor is axially compressed by means of a special tool whereby the inner conductor is exposed. Subsequently the cable with exposed inner conductor is inserted into a usual contact device and attached in the same in the usual manner. Therefore this known solution requires a special preparation step of the cable which requires to provide a special tool device.

SUMMARY OF THE INVENTION

The invention aims to provide a contact device of the above-mentioned type wherein connecting the cable with the contact device can be substantially simplified.

According to the invention the contact device of the above-mentioned type is characterized to this end by a guiding element and a stop element for each inner conductor, wherein the guiding element directs the inner conductor with its inner insulating sheath at the corresponding stop element in such a manner that during insertion of the cable into the contact device, the inner insulating sheath is axially compressed by the stop element, wherein seen in cable insertion direction, each connection terminal for an inner conductor is located beyond the corresponding stop element.

In this manner a contact device is obtained wherein except for removing the outer insulating sheath and the shield no further preparation of the end of the cable to be connected is required and the cable can be connected with the contact device by simply inserting the inner conductor(s) through the corresponding guiding element, whereby the inner insulating sheath is automatically axially compressed by the stop element so that the inner conductor will be exposed at the corresponding connection terminal. Thereafter the inner conductor can be connected with this connection terminal in a usual manner.

According to a simple embodiment of the contact device according to the invention each stop element is formed by an end edge of each corresponding connection terminal for an inner conductor and/or of the dielectric insert.

Preferably each guiding element is formed by an annular channel fittingly enclosing the inner conductor with inner insulating sheath. In this case in a very favourable embodiment of the invention each guiding element consists of electrically conductive material and is connected with the connection terminal for the outer conductor. Thereby it is obtained that each inner conductor also along the part where the shield of the cable is removed, is nevertheless enclosed by a shielding.

According to the invention it is preferred that the connection terminal for the sheath is formed by a ring adapted to align the cable with its inner conductor(s) with the guiding element(s). Thereby the connection terminal for the outer conductor provides a type of prepositioning of the cable whereby each inner conductor can be easily inserted into the corresponding guiding element.

The invention will be further explained by reference to the drawings in which an embodiment of the contact device according to the invention is shown.

DESCRIPTION OF THE DRAWINGS

FIG. 3a, 3b–5a, 5b show partly in cross section a top view and a side view, respectively, of successive steps during the insertion of the cable and into the contact device of FIG. 1.

DETAILED DESCRIPTION

Figure 1:
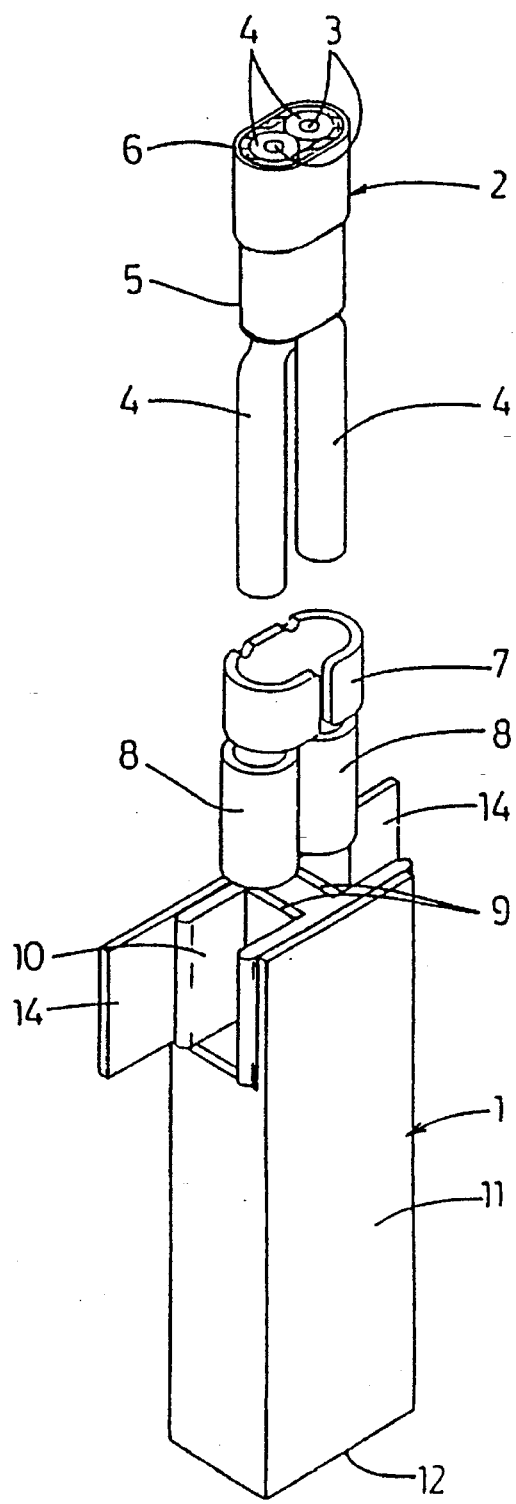
FIG. 1 perspectively shows an embodiment of a contact device according to the invention, wherein an end part of a twinaxial cable is shown before the same is inserted into the contact device.

In the drawings there is shown a contact device 1 for a twinaxial cable 2, an end part of which is shown in FIG. 1. It is noted that the contact device can of course also be adapted for a coaxial cable. The twinaxial cable 2 is provided with two inner conductors 3 with an inner insulating sheath 4 and a common shield 5 consisting of braided metal wire. The shield 5 is enclosed by an outer insulating sheath 6. In FIG. 1 the end part of the cable 2 is stripped of a part of the outer insulating sheath 6 and a part of the shield 5, so that both inner conductors 3 with insulating sheath 4 extend out of the shield 5.

The contact device 1 comprises a connection terminal 7 for the shield 5, said connection element 7 consisting in this case of a flat ring. The connection terminal 7 is followed by a guiding element 8 for each inner conductor 3 with insulating sheath 4, which guiding element in the embodiment shown is made of the same material as the connection terminal 7 and is made as an annular channel fittingly enclosing the inner conductor 3 with insulating sheath 4.

Figure 3A:
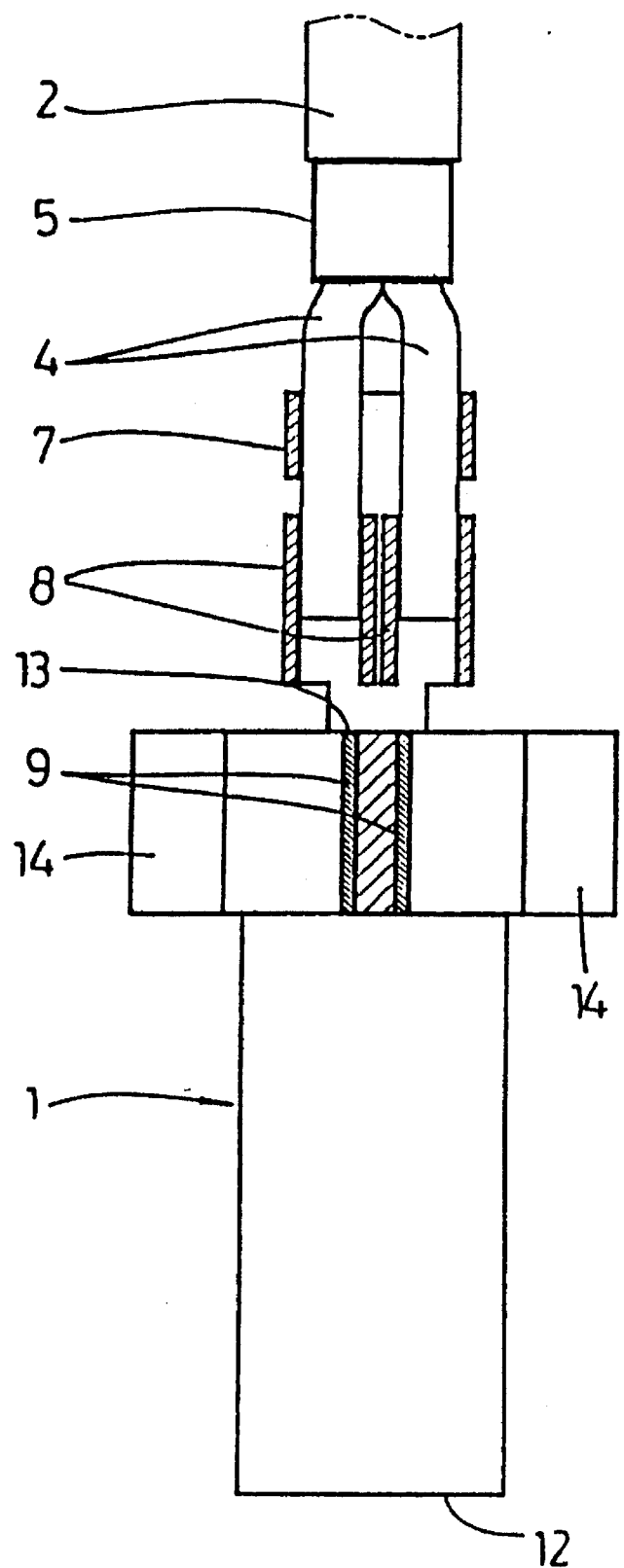
Figure 3B:
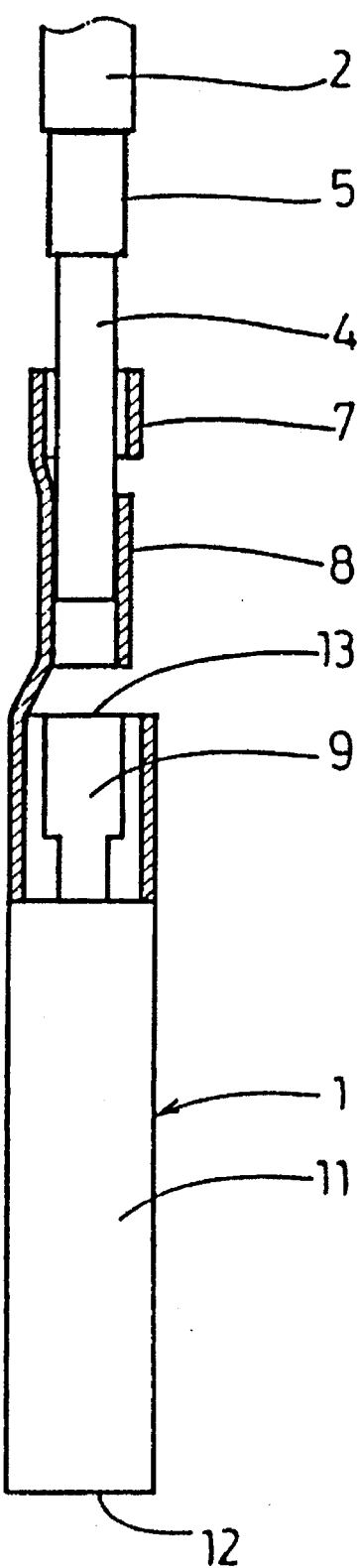

As shown in FIGS. 3a, 3b, the connection element 7 is located in such a manner with respect to the guiding elements 8 that during insertion of the inner conductors 3 with insulating sheath 4 in the connection terminal 7, said inner conductors 3 are aligned with the guiding element 8. Thereby pushing the inner conductors 3 with insulating sheath 4 into the guiding elements 8 is facilitated.

The guiding elements 8 are followed by a connection terminal 9 for each inner conductor 3, wherein the connection terminals 9 are separated from the shield 11 of the contact 1 by a dielectric insert 10 consisting of insulating material. The drawing shows that the connection terminal 7 and the guiding elements 8 are formed of an extension of this shield 11. The coupling part 12 which can be connected to a coupling socket or the like, is not further shown and does not form part of the present invention.

Figures 4A, 4B:
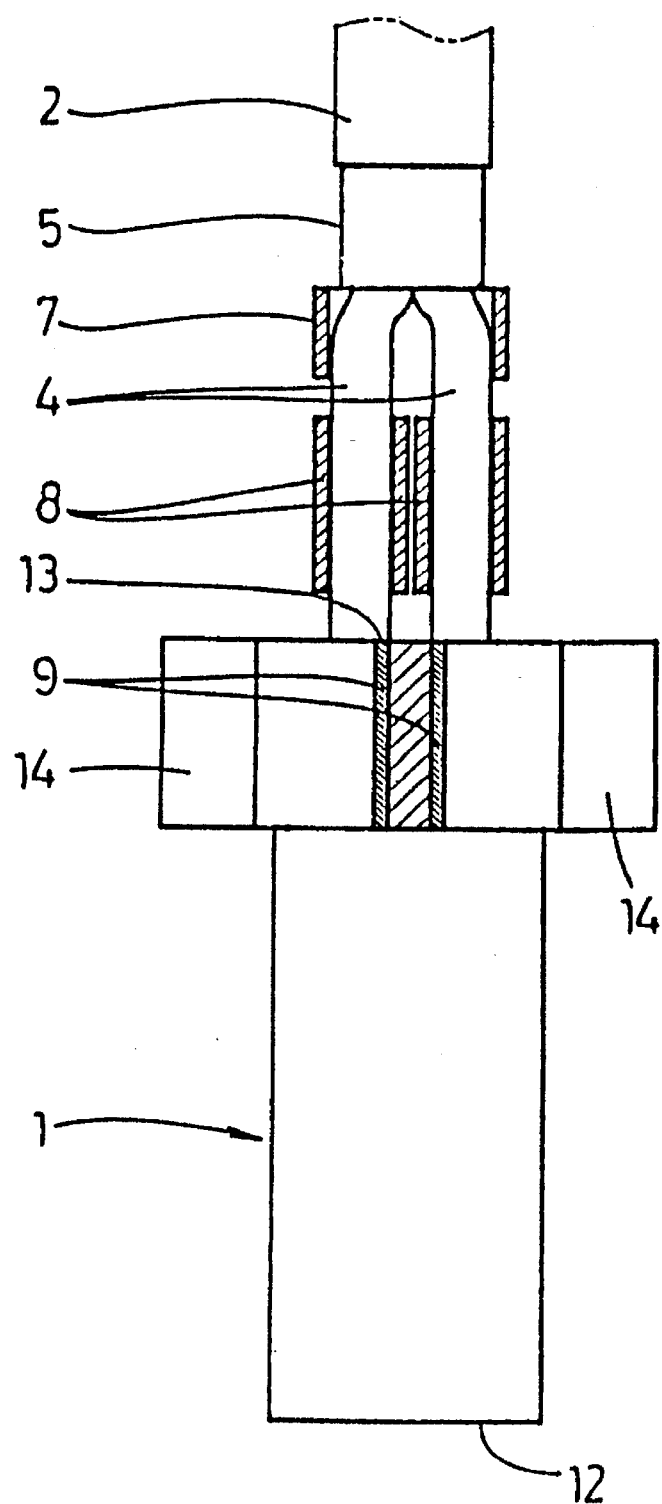

An end edge 13 of each connection terminal 9 and/or the dielectric insert 10 forms a stop element, by which the inner insulating sheath 4 of the corresponding inner conductor 3 is stopped during insertion of the cable 2 into the contact device 1. FIG. 4a, 4b, show the position in which the insulating sheath 4 of the inner conductors 3 just meets the end edge 13 of the connection terminal 9. By a suitable design of the insert 10 the stop element can completely be formed by an end face of this insert.

Figure 5A:
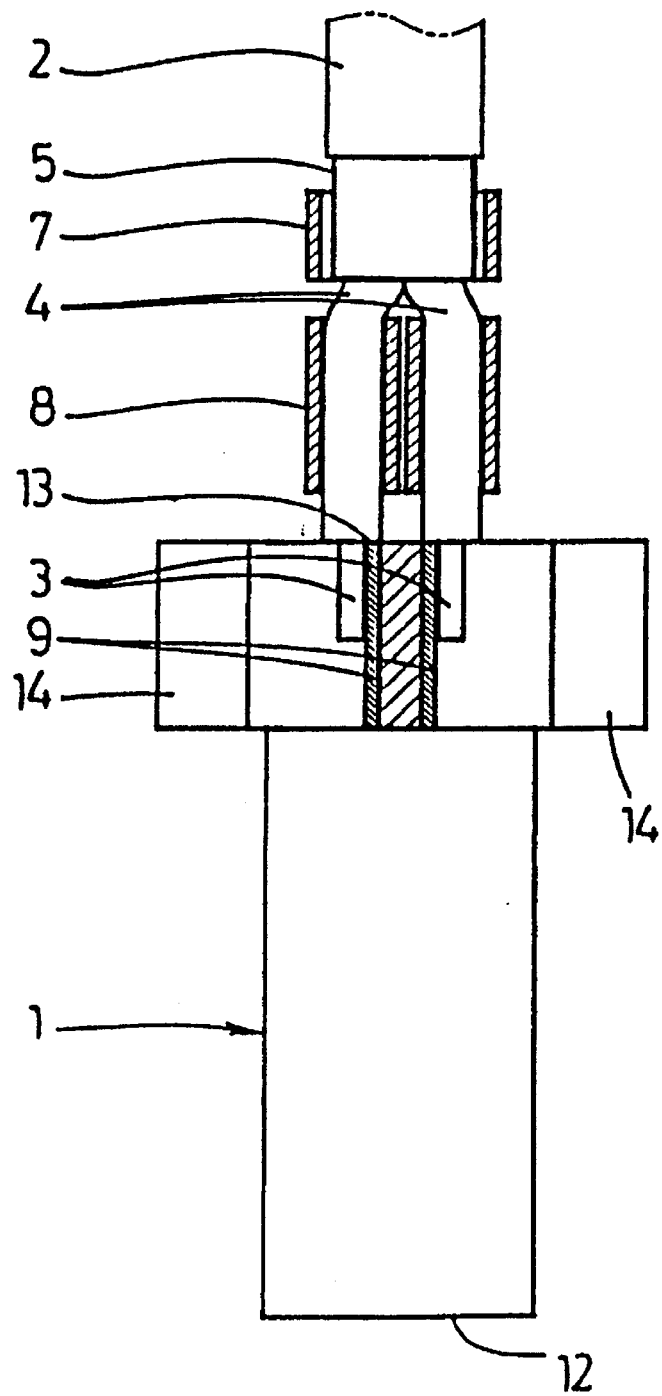
Figure 5B:
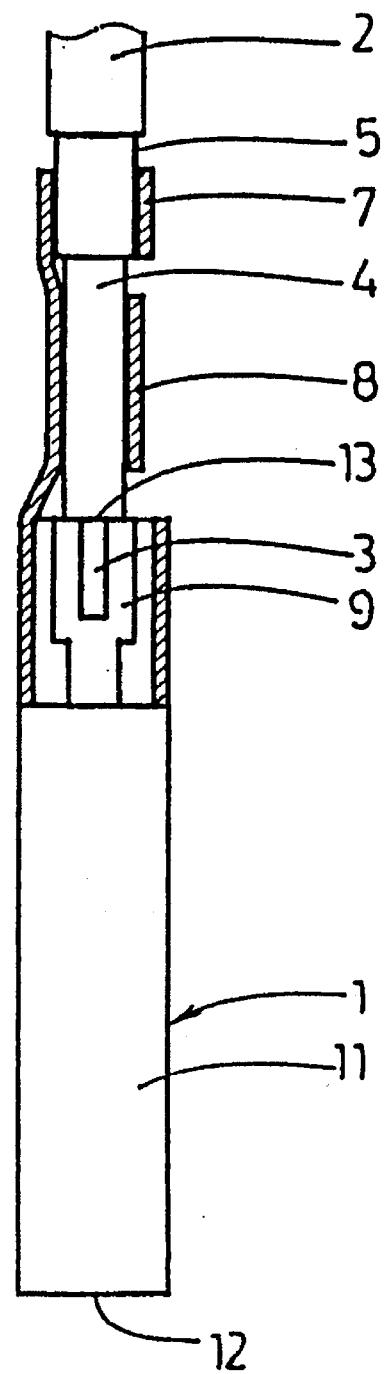

When the cable 2 is now pushed further into the contact device 1, the insulating sheaths 4 of the inner conductors 3 are axially compressed by the stop elements 13, so that the ends of the inner conductors 3 will be exposed in front of the connection terminals 9 as shown in FIG. 5a, 5b. Thereafter the ends of the inner conductors 3 can be simply connected with the connection terminals 9, for example by soldering.

Figure 2:
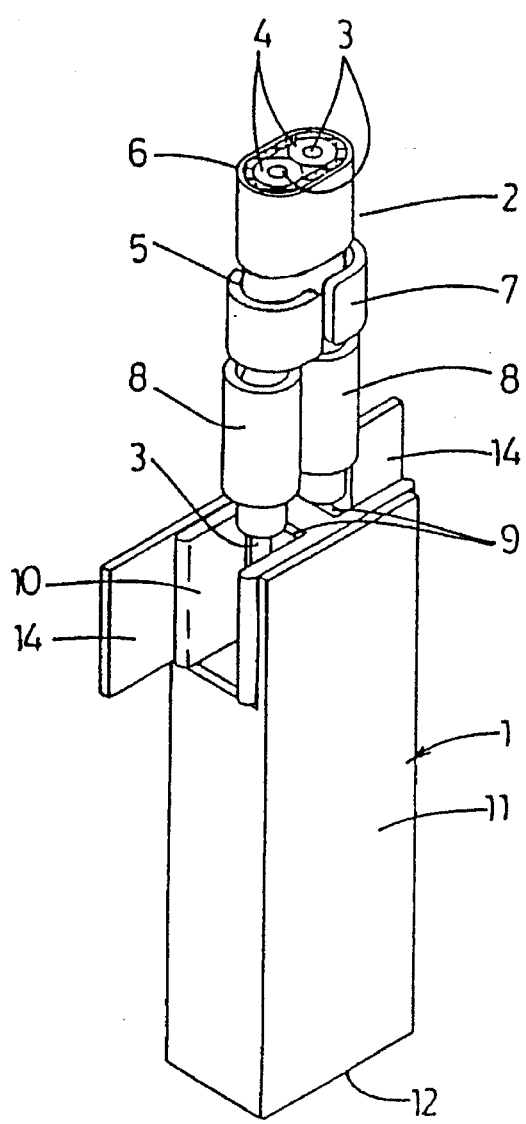
FIG. 2 perspectively shows the contact device of FIG. 1, wherein the cable end part is completely inserted into the contact device.

FIG. 2 shows the situation of FIG. 5 in perspective view. After soldering the ends of the inner conductors 3, wings 14 of the shield 11 can be closed so that the shield 11 of the contact device 1 is completely closed again and thereby there is no interruption in the shielding anymore.

From the foregoing it will be understood that connecting a contact device to the end of the cable 2 is very simple when using the described contact device 1. Removing the outer insulating sheath 6 and, the shield 5 can be done in a usual manner, whereas it is not required to remove the inner insulating sheath 4 of the inner conductors 3. By simply inserting the inner conductors 3 with insulating sheath 4 into the connection terminal 7 and subsequently into the guiding elements 8, said inner conductors are automatically directed with their insulating sheath at the stop elements 13, whereby the insulating sheaths 4 are axially compressed and the inner conductors 3 are exposed. The guiding elements 8 further have the important advantage that they extend along a substantial part of the inner conductors 3, whereby also the part of these inner conductors 3 where the shield 5 is removed, still has a shielding.

The invention is not restricted to the above described embodiment which can be varied in a number of ways within the scope of the claims.

We claim:

1. A contact device for a cable conductor comprising one or more inner conductors having an inner insulating sheath and a common shield together with an outer insulating sheath, said contact device comprising:

a first connection terminal for the shield;

a second connection terminal for each inner conductor;

a guiding element for each inner insulating sheath; and a stop element for each inner insulating sheath, wherein said guiding element is provided on said first connection terminal and is adapted to direct an end portion of the inner insulating sheath of the inner conductor to engage a corresponding said stop element provided on said second connection terminal, upon insertion of the cable into the contact device, with the inner insulating sheath being axially compressed by the stop element, and, as seen in a cable insertion direction, a portion of the inner conductor is thereby located beyond the corresponding stop element for connection to said second connection terminal.

2. A contact device according to claim 1, characterized in that each stop element is formed by an end edge portion of said second corresponding connection terminal for an inner conductor.

3. A contact device according to claim 1, characterized in that each guiding element is formed by an annular channel member fittingly enclosing the inner conductor within its inner insulating sheath.

4. A contact device according to claim 3, characterized in that each guiding element is formed of electrically conductive material and is connected to the first connection terminal.

5. A contact device according to claim 4, characterized in that each guiding element extends from said first connection terminal up to adjacent the corresponding second connection terminal.

6. A contact device according to claim 5, characterized in that the first connection terminal is formed by a ring adapted to align the cable with its inner conductor with the guiding element.

7. A contact device for a cable conductor comprising at least one inner conductor and inner insulating sheath and a common shield together with an outer insulating sheath, the contact device comprising:

a first connection terminal for the shield;

a second connection terminal for each inner conductor;

a guiding element for each inner insulating sheath located between the first terminal and the second terminal; and a stop element for each inner insulating sheath located proximate the second terminal, wherein, upon insertion of the cable into the contact device, each of the guiding elements is adapted to direct an end portion of one of the inner insulating sheaths to engage a corresponding one of the stop elements and, upon further movement of the cable towards the stop element, the inner insulating sheath is axially compressed by the stop element, a portion of each of the inner conductors is thereby partially exposed from its inner insulating sheath and located beyond the corresponding stop element for its inner insulating sheath for connection to a corresponding one of the second connection terminals.

* * * * *